United States Patent
Park et al.

(10) Patent No.: US 8,415,047 B2
(45) Date of Patent: Apr. 9, 2013

(54) BATTERY MODULE INCLUDING A PORTION OF A COUPLING UNIT FREE OF ANY SCREW SURFACE AND METHOD OF MANUFACTURING THE BATTERY MODULE

(75) Inventors: Shi-Dong Park, Yongin-si (KR); Tae-Yong Kim, Yongin-si (KR); Myung-Chul Kim, Yongin-si (KR); Hyun-Ye Lee, Yongin-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 285 days.

(21) Appl. No.: 12/805,259

(22) Filed: Jul. 21, 2010

(65) Prior Publication Data

US 2011/0151299 A1 Jun. 23, 2011

(30) Foreign Application Priority Data

Dec. 18, 2009 (KR) ........................ 10-2009-0126924

(51) Int. Cl.
*H01M 2/10* (2006.01)
*H01M 6/42* (2006.01)
*H01M 2/04* (2006.01)

(52) U.S. Cl.
USPC ............. 429/99; 429/149; 429/163; 429/176; 429/186

(58) Field of Classification Search ............ 429/99, 429/100, 70, 162, 159, 149, 163, 176, 186
See application file for complete search history.

(56) References Cited

U.S. PATENT DOCUMENTS

| | | | | |
|---|---|---|---|---|
| 1,622,767 | A | * | 3/1927 | Cole ............................ 429/159 |
| 2004/0157117 | A1 | * | 8/2004 | Tamaki et al. ................. 429/99 |
| 2005/0058891 | A1 | * | 3/2005 | Marraffa ........................ 429/99 |
| 2005/0089751 | A1 | * | 4/2005 | Oogami et al. ............... 429/162 |
| 2005/0260488 | A1 | * | 11/2005 | Zhou et al. ...................... 429/99 |

FOREIGN PATENT DOCUMENTS

| | | |
|---|---|---|
| JP | 2006-185815 A | 7/2006 |
| KR | 20-0388449 Y1 | 6/2005 |
| KR | 20-0401730 Y1 | 11/2005 |

OTHER PUBLICATIONS

Korean Office Action in KR 10-2009-0126924, dated Apr. 19, 2011 (Park, et al.).
Korean Notice of Allowance in KR 10-2009-0126924, dated Nov. 29, 2011 (Park, et al.).

* cited by examiner

*Primary Examiner* — Basia Ridley
*Assistant Examiner* — Kenneth Douyette
(74) *Attorney, Agent, or Firm* — Lee & Morse, P.C.

(57) ABSTRACT

A battery module for accommodating a plurality of batteries connected to each other in a battery unit, the battery module including a pair of end plates facing each other; a restrainer coupled to the pair of end plates, the restrainer being configured to restrain expansion of the battery unit; and a coupling unit for coupling the end plates and the restrainer to each other, wherein a portion of the coupling unit that contacts the end plate and the restrainer is free of any screw surface.

3 Claims, 5 Drawing Sheets

BATTERY MODULE INCLUDING A PORTION OF A COUPLING UNIT FREE OF ANY SCREW SURFACE AND METHOD OF MANUFACTURING THE BATTERY MODULE

BACKGROUND

1. Field

Embodiments relate to a battery module and a method of manufacturing the battery module.

2. Description of the Related Art

A battery module, which may include a plurality of connected batteries, is an element of a large capacity power supply unit. Such a battery module may be used as a power source in, e.g., electric cars.

The battery module may include, e.g., lithium ion batteries. Performance of a lithium ion battery rarely degrades, even with repeated charging/discharging operations. However, lithium ion batteries may expand due to movement of lithium ions when the lithium ion battery is charged/discharged. Since the battery module may include a plurality of lithium ion batteries, the battery module may expand about 5 to about 10% larger than its original size. The battery module may be deformed and thus, it may be difficult to attach/detach the battery module to/from a desired location; and an electric resistance of the lithium ion battery may increase. Moreover, when the battery module is used in an electric car, a battery pack including, e.g., about eight battery modules, may be mounted in the electric car. Thus, the deformation may become severe.

SUMMARY

Embodiments are directed to a battery module and a method of manufacturing the battery module, which represents advances over the related art.

It is a feature of an embodiment to provide a battery module including a restrainer having an improved fixing structure in order to stably restrain battery expansion.

At least one of the above and other features and advantages may be realized by providing a battery module for accommodating a plurality of batteries connected to each other in a battery unit, the battery module including a pair of end plates facing each other; a restrainer coupled to the pair of end plates, the restrainer being configured to restrain expansion of the battery unit; and a coupling unit for coupling the end plates and the restrainer to each other, wherein a portion of the coupling unit that contacts the end plate and the restrainer is free of any screw surface.

The coupling unit may include a bolt, the bolt including a body extending through the restrainer and the end plate and having a screw surface on an outer circumferential surface thereof, and a head on an end portion of the body; a nut coupled to the screw surface of the bolt; and a cylindrical member on the bolt between the head and the nut, the cylindrical member surrounding the screw surface of the body and contacting the restrainer and the end plate, an outer circumferential surface of the cylindrical member constituting the portion of the coupling unit that contacts the end plate and the restrainer.

The outer circumferential surface of the cylindrical member may be substantially smooth.

The coupling unit may further include a washer compressed by the head.

The coupling unit may include a bolt, the bolt including a body having a screw surface on an end portion of an outer circumferential surface thereof, and a non-screw surface on a part thereof that contacts the end plate and the restrainer, the non-screw surface constituting the portion of the coupling unit that contacts the end plate and the restrainer, and a head on another end portion; and a nut coupled to the screw surface on the end portion of the bolt.

The non-screw surface of the body in the bolt may be substantially smooth.

The coupling unit may further include a washer compressed by the head.

At least one of the above and other features and advantages may also be realized by providing a method of manufacturing a battery module for accommodating a plurality of batteries connected to each other in a battery unit, the method including preparing a pair of end plates such that the end plates face each other; and coupling a restrainer to the pair of end plates in order to restrain expansion of the battery unit by inserting a bolt having a screw surface on an outer circumferential surface thereof; and surrounding the screw surface with a cylindrical member having an outer circumferential surface free of any screw surface through holes in the end plate and the restrainer, and coupling a nut to an end portion of the screw surface of the bolt.

The method may further include inserting a washer between the bolt and the cylindrical member.

At least one of the above and other features and advantages may also be realized by providing a method of manufacturing a battery module for accommodating a plurality of batteries connected together in a battery unit, the method including preparing a pair of end such that the end plates face each other; and coupling a restrainer to the pair of end plates in order to restrain expansion of the battery unit by inserting a bolt having a screw surface on an outer circumferential surface thereof of an end portion thereof and a non-screw surface on a portion thereof contacting the restrainer and the end plates through holes in the end plate and the restrainer, and coupling a nut to an end portion of the screw surface of the bolt.

The method may further include inserting a washer on the other end portion of the bolt.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
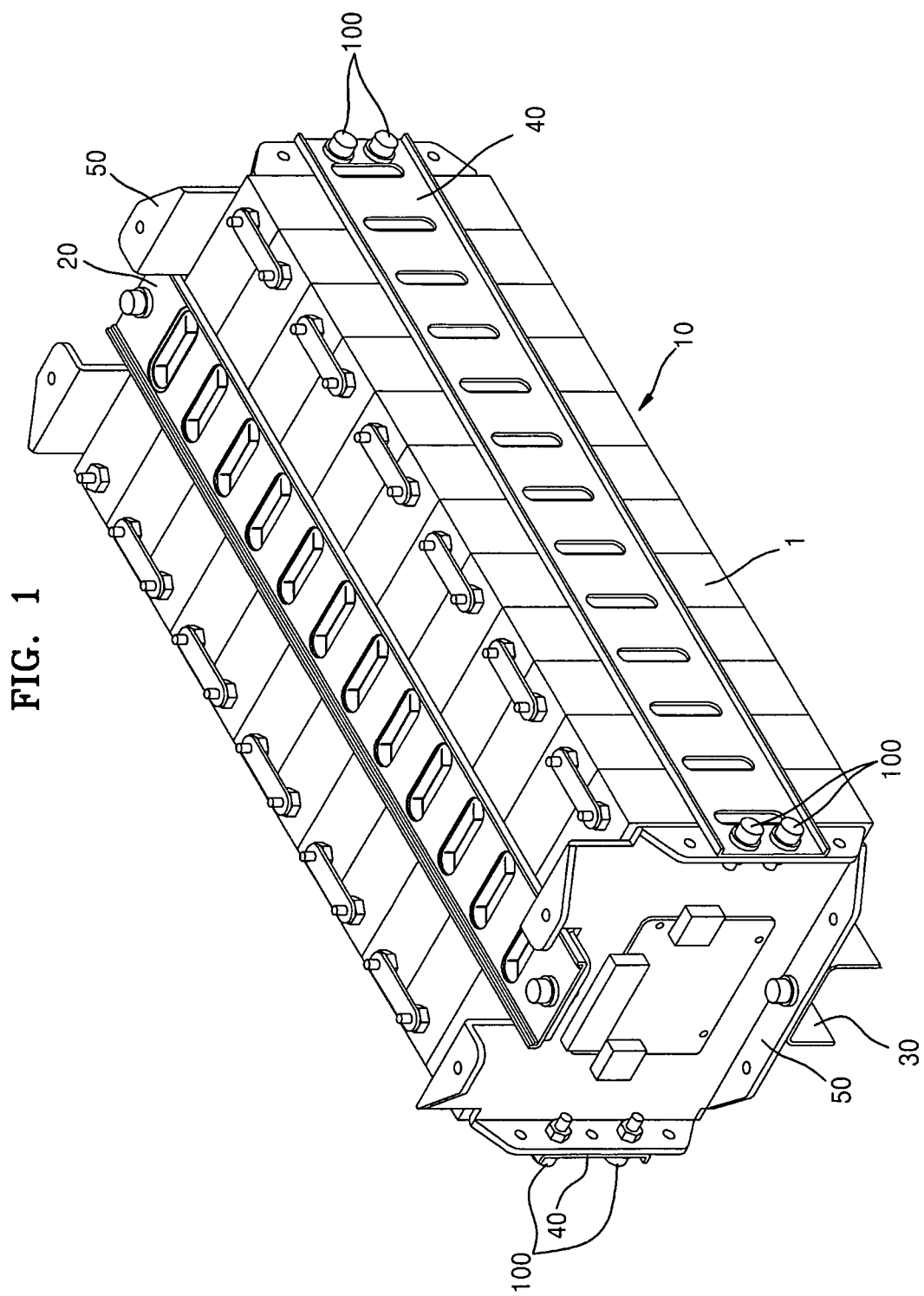
FIG. 1 illustrates a perspective view of a battery module according to an embodiment.

Korean Patent Application No. 10-2009-0126924, filed on Dec. 18, 2009, in the Korean Intellectual Property Office, and entitled: "Battery Module Having Restrainer with Improved Fixing Structure and Method of Manufacturing the Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

FIG. 1 illustrates a perspective view of a battery module according to an embodiment. Referring to FIG. 1, the battery module of the present embodiment may accommodate therein a battery unit 10 including a plurality of batteries 1 connected in series. The battery module may include a plurality of plates 20, 30, and 50 surrounding the battery unit 10. The plates may include an upper plate 20 and a lower plate 30, which may be respectively coupled to upper and lower portions of the battery unit 10. The plates may also include a pair of end plates 50 at both end portions of the battery unit 10. In addition, restrainers 40 may be coupled to the pair of end plates 50. The restrainers 40 may fix the pair of end plates 50 in order to restrain expansion of the battery unit 10. That is, when the battery unit 10 expands, a pushing force may be exerted by the battery unit 10 on the end plates 50; and the restrainers 40 may hold the pair of end plates 50 so as to prevent deformation of the end plates 50.

Figure 2:
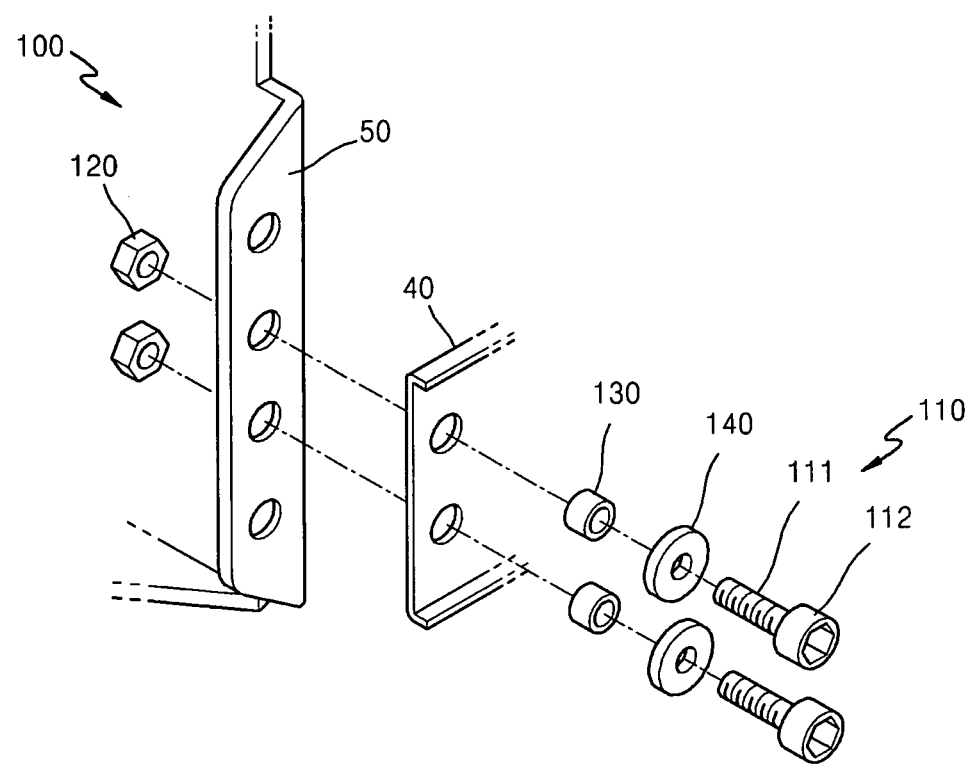
FIGS. 2 and 3 illustrate a coupling unit for fixing a restrainer in the battery module of FIG. 1.
Figure 3:
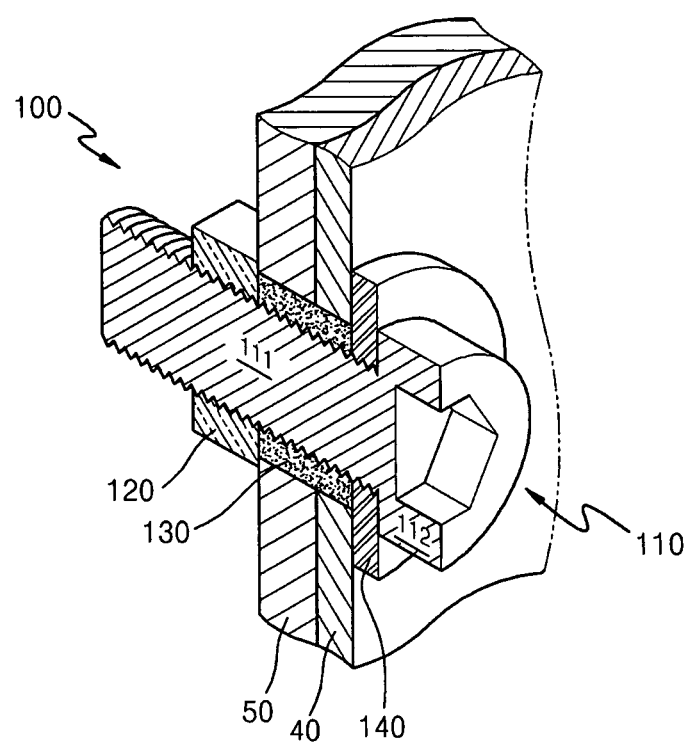

In the battery module of the present embodiment, a coupling unit 100 for coupling the restrainer 40 to the end plate 50, as illustrated in FIGS. 2 and 3, may prevent the deformation of the battery unit 10.

Referring to FIGS. 2 and 3, the coupling unit 100 may include a bolt 110 penetrating through the restrainer 40 and the end plate 50, a nut 120 coupled to an end portion of the bolt 110, and a cylindrical member 130 between a head 112 of the bolt 110 and the nut 120.

The bolt 110 may include a body 111 having a screw surface thereon and the head 112 on an end portion of the body 111. Thus, the bolt 110 may be inserted so as to extend through the restrainer 40 and the end plate 50. Then, the nut 120 may be coupled to an end portion of the bolt 110 opposite to the head 112. In particular, the nut 120 may be coupled to the screw surface of the body 111. Thus, the bolt 110 and the nut 120 may be firmly coupled to each other. A washer 140 may be compressed between the head 112 and the restrainer 40 to prevent the bolt 110 from releasing.

When the bolt 110 is inserted through the restrainer 40 and the end plate 50, the bolt 110 may be inserted such that the cylindrical member 130 having an outer circumferential surface that is free of any screw thread or other irregular surface features, e.g., which may be smooth, surrounds a part of the screw surface of the body 111, i.e., between a portion of the body 111 and the restrainer 40 or the end plate 50. Thus, a fixing status of the restrainer 40 may be firmly maintained.

The cylindrical member 130 may be used because of following reasons. If the bolt 110 is directly coupled to the nut 120 without including the cylindrical body 130 thereon, the restrainer 40 or the end plate 50 may contact the screw surface of the body 111. Thus, in a contact region between the restrainer 40 or the end plate 50 and the bolt 110, the restrainer 40 or the end plate 50 may contact a screw thread. A coupling portion may be continuously compressed due to the expansion of the batteries while the battery module is operated. Thus, since the screw thread is an irregular surface, in which the screw threads and screw recesses are repeated, the restrainer 40 and the end plate 50 on the screw threads may slide into the screw recesses whenever the batteries expand and/or contract and they are twisted against the screw surface. Therefore, the force for supporting the end plates 50 against the expansion of batteries may be reduced, and thus, the battery expansion may not be stably prevented. If the restrainer 40 and the end plate 50 move only about 0.1 mm, a force of about 50 kgf for supporting the end plates 50 is reduced.

Therefore, according to the present embodiment, the cylindrical member 130 may cover a portion of the screw surface of the body 111 that the restrainer 40 and the end plate 50 are in contact with, so that the restrainer 40 and the end plate 50 may contact the smooth outer circumferential surface of the cylindrical member 130. Accordingly, the restrainer 40 and the end plate 50 may contact only the unthreaded, e.g., smooth, outer circumferential surface, rather than the irregular screw surface. Thus, movement of the restrainer 40 and the end plate 50 due to contact with an irregular rough surface, e.g., the screw surface, may be substantially prevented.

Accordingly, the battery module that may stably restrain the deformation of the battery module caused by the battery expansion may be realized.

Processes of coupling the coupling unit 100 in a method of manufacturing the battery module will be described as follows.

First, holes in the end plate 50 and the restrainer 40 may be aligned with each other. Then, the bolt 110 and the cylindrical member 130 may be inserted in the holes. The washer 140 may be inserted between the head 112 of the bolt 110 and the cylindrical member 130. Then, the bolt 110 having the cylindrical member 130 and the washer 140 thereon may be inserted into the holes so that the cylindrical member 130 may directly contact the end plate 50 and the restrainer 40. Alternatively, the bolt 110 may be inserted into the holes after inserting the cylindrical member 130 in the holes first. When the bolt 110 and the cylindrical member 130 are inserted in the holes, the nut 120 may be coupled to the screw surface of the end portion of the bolt 110. Thus, the bolt 110 and the nut 120 may be stably and firmly coupled to each other.

Figure 4:
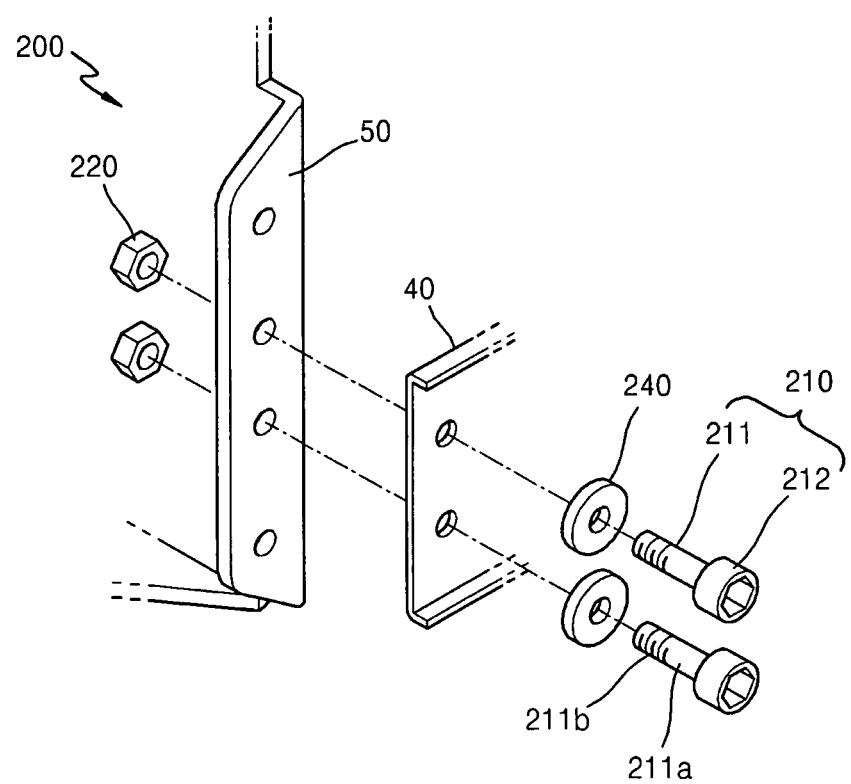
FIGS. 4 and 5 illustrate a modified example of the coupling unit of FIGS. 2 and 3.
Figure 5:
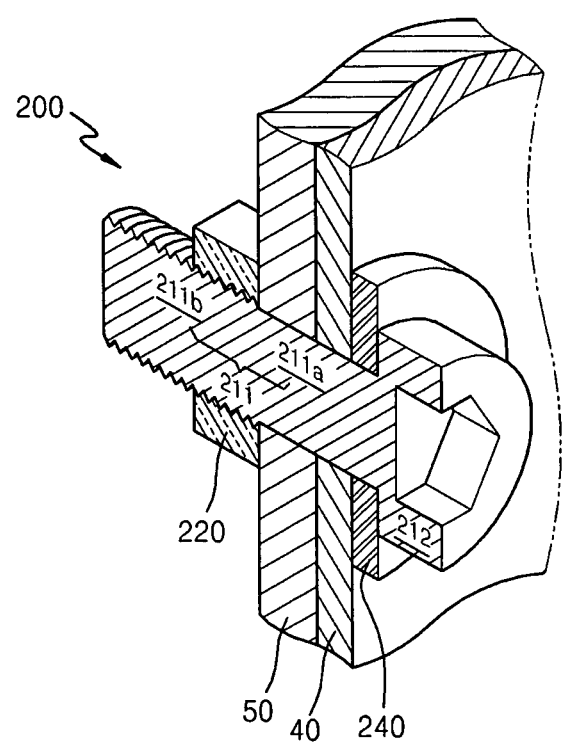

FIGS. 4 and 5 illustrate a modified example of the coupling unit 100 of the previous embodiment.

Referring to FIGS. 4 and 5 the coupling unit 200 of the present embodiment may have a structure in which the end plate 50 and the restrainer 40 are coupled to each other by using a bolt 210, a nut 220, and a washer 240 to prevent the coupling structure from releasing. However, in the present embodiment, a non-screw surface 211a and a screw surface 211b to which the nut 220 will be coupled may be formed on a body 211 of the bolt 210, instead of using an additional cylindrical member. That is, a portion of the bolt 210 that contacts the restrainer 40 and the end plate 50 may be the non-screw surface 211a having a smooth surface, and the screw surface 211b may be formed only on end portions of the bolt 210, to which the nut 220 will be coupled. Thus, the restrainer 40 and the end plate 50 may not move on the screw surface 211b and an additional cylindrical member is not necessary.

Coupling processes of the coupling unit will be described as follows.

First, holes in the end plate 50 and the restrainer 40 may be aligned with each other. Then, the bolt 210 may be inserted into the holes and through the washer 240 that is to be compressed by the head 212 of the bolt 210. Then, the bolt 210 may be arranged such that the non-screw surface 211a may directly contact the end plate 50 and the restrainer 40. When the bolt 210 is inserted into the holes, the nut 220 may be coupled to the screw surface 211b at the end portion of the bolt 210. Thus, the end plate 50 and the restrainer 40 may be stably and firmly coupled to each other.

According to the battery module having the above described structure, movement of the restrainer 40 and the end plate 50 along the screw surface 211b on the coupling bolt 210 may be prevented. Thus, the deformation of the battery module caused by the battery expansion may be stably restrained.

Therefore, the battery module of an embodiment may include a restrainer for restraining the expansion of secondary batteries. The restrainer may be fixed with an appropriate tensile force in order to stably compensate for the expansion of the batteries.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module for accommodating a plurality of batteries connected to each other in a battery unit, the battery module comprising:

a pair of end plates facing each other;

a restrainer coupled to the pair of end plates, the restrainer being configured to restrain expansion of the battery unit; and a coupling unit for coupling the end plates and the restrainer to each other, wherein:

a portion of the coupling unit that contacts the end plate and the restrainer is free of any screw surface, and the coupling unit includes:

a bolt, the bolt including:

a body extending through the restrainer and the end plate and having a screw surface on an outer circumferential surface thereof, and a head on an end portion of the body;

a nut coupled to the screw surface of the bolt; and a cylindrical member on the bolt between the head and the nut, an outer circumferential surface of the cylindrical member being concentric with the outer circumferential surface of the body such that the cylindrical member surrounds the screw surface of the body, the cylindrical member contacting the restrainer and the end plate, and the outer circumferential surface of the cylindrical member constituting the portion of the coupling unit that contacts the end plate and the restrainer.

2. The battery module as claimed in claim 1, wherein the outer circumferential surface of the cylindrical member is substantially smooth.

3. The battery module as claimed in claim 1, wherein the coupling unit further includes a washer compressed by the head.

* * * * *